(12) United States Patent
Torii et al.

(10) Patent No.: US 6,242,824 B1
(45) Date of Patent: Jun. 5, 2001

(54) MOTOR AND MANUFACTURING METHOD THEREOF

(75) Inventors: Katsuhiko Torii, Hamamatsu; Hiroaki Yamamoto, Kosai, both of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/538,496

(22) Filed: Mar. 30, 2000

(30) Foreign Application Priority Data

Feb. 20, 2000 (JP) ................................................. 12-025197

(51) Int. Cl.[7] .............................................................. H02K 5/00
(52) U.S. Cl. ......................... 310/42; 29/596; 74/606 R; 310/75 R; 310/89
(58) Field of Search ...................... 310/89, 75 R, 310/67 R, 42, 96, 98, 99, 101; 29/596; 74/421 A, 425, 606 R

(56) References Cited

U.S. PATENT DOCUMENTS

| | | | |
|---|---|---|---|
| 1,945,361 | * 1/1934 | Ball ........................................ | 310/75 R |
| 2,306,233 | * 12/1942 | Smith ..................................... | 74/606 R |
| 3,269,204 | * 8/1966 | Schleicher ............................. | 310/75 R |
| 4,227,104 | * 10/1980 | Hamman ................................ | 310/75 R |
| 5,015,897 | * 5/1991 | Inagaki et al. ......................... | 310/83 |
| 5,041,751 | * 8/1991 | Yokozuka .............................. | 310/239 |
| 5,056,213 | * 10/1991 | Behnke et al. ........................ | 29/596 |
| 5,216,307 | * 6/1993 | Hosoya ................................... | 310/89 |

* cited by examiner

Primary Examiner—Burton Mullins
(74) Attorney, Agent, or Firm—Law Office of David G. Posz

(57) ABSTRACT

A motor is provided wherein a spindle of a motor body and a worm shaft of a speed reducer are easily coupled. When a yoke housing and a gear housing are to be assembled, first engaging bulges and on the side of the yoke housing and second engaging bulges and on the gear housing are engaged to position a spindle and a worm shaft on a common axis. If the relative rotational positions of a two-plane width bulge of the spindle and a two-plane width hole of a clutch coupled to the worm shaft fail to be located at predetermined positions, the two-plane width bulge is fitted in the two-plane width hole by driving the spindle rotationally while urging the yoke housing and the gear housing in the assembled direction.

10 Claims, 8 Drawing Sheets

MOTOR AND MANUFACTURING METHOD THEREOF

CROSS-REFERENCE TO RELATED APPLICATION

The present invention is related to Japanese patent application No. 2000-25197, filed Feb. 2, 2000, the contents of which are incorporated herein by reference.

FIELD OF THE INVENTION

The present invention relates to a motor and, more particularly, to a motor having a speed reducer and a method for assembling the motor's speed reducer to the motor's body.

BACKGROUND OF THE INVENTION

In the prior art, a motor used in a power window device or the like has a motor body and a speed reducer. The motor body has a yoke housing, wherein a spindle having an armature is rotatably supported. The speed reducer has a gear housing, wherein a worm shaft and a worm wheel are housed. The worm wheel is meshed with the worm shaft. The yoke housing and the gear housing are assembled by moving them in the axial direction. Moreover, the spindle and the worm shaft are coupled on a common axis before the yoke housing and the gear housing come into abutment.

When the spindle of the motor body is rotationally driven, the worm shaft is rotated according to the rotational direction of the spindle. As the worm shaft rotates, the worm wheel rotates at a speed lower than that of the worm shaft but with high torque. Then, the output shaft, coupled to the worm wheel, rotates to transmit its rotating force to an external load.

However, when the yoke housing and the gear housing of the motor are assembled, the mounting area for the spindle and the mounting area for the worm shaft must be aligned (or fitted) while being accurately held on the common axis. This is troublesome and difficult.

On the other hand, the spindle mounting area and the worm shaft mounting area have to be made such that they can be fitted (or connected) in the axial direction when their relative rotational positions are at predetermined positions. As such, they engage in the rotational direction and cannot rotate relative to each other when they are fitted (or connected). For this requirement, the connection portions have a D-shaped fitting bulge and a D-shaped fitting recess. When the yoke housing and the gear housing are assembled, however, the bulge and recess have arbitrary rotational positions. As such, it is also troublesome to position the bulge and recess in the proper rotational direction for their connection (or fitting). As a result, assembly time is increased. The present invention was developed in light of these drawbacks.

SUMMARY OF THE INVENTION

It is therefore an object of the present invention to provide a motor housing being easily capable of being coupled to a gear housing.

A motor is provided wherein a spindle of a motor body and a worm shaft of a speed reducer are easily coupled. When a yoke housing and a gear housing are to be assembled, first engaging bulges and on the side of the yoke housing and second engaging bulges and on the gear housing are engaged to position a spindle and a worm shaft on a common axis. If the relative rotational positions of a two-plane width bulge of the spindle and a two-plane width hole of a clutch coupled to the worm shaft fail to be located at predetermined positions, the two-plane width bulge is fitted in the two-plane width hole by driving the spindle rotationally while urging the yoke housing and the gear housing in the assembled direction.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
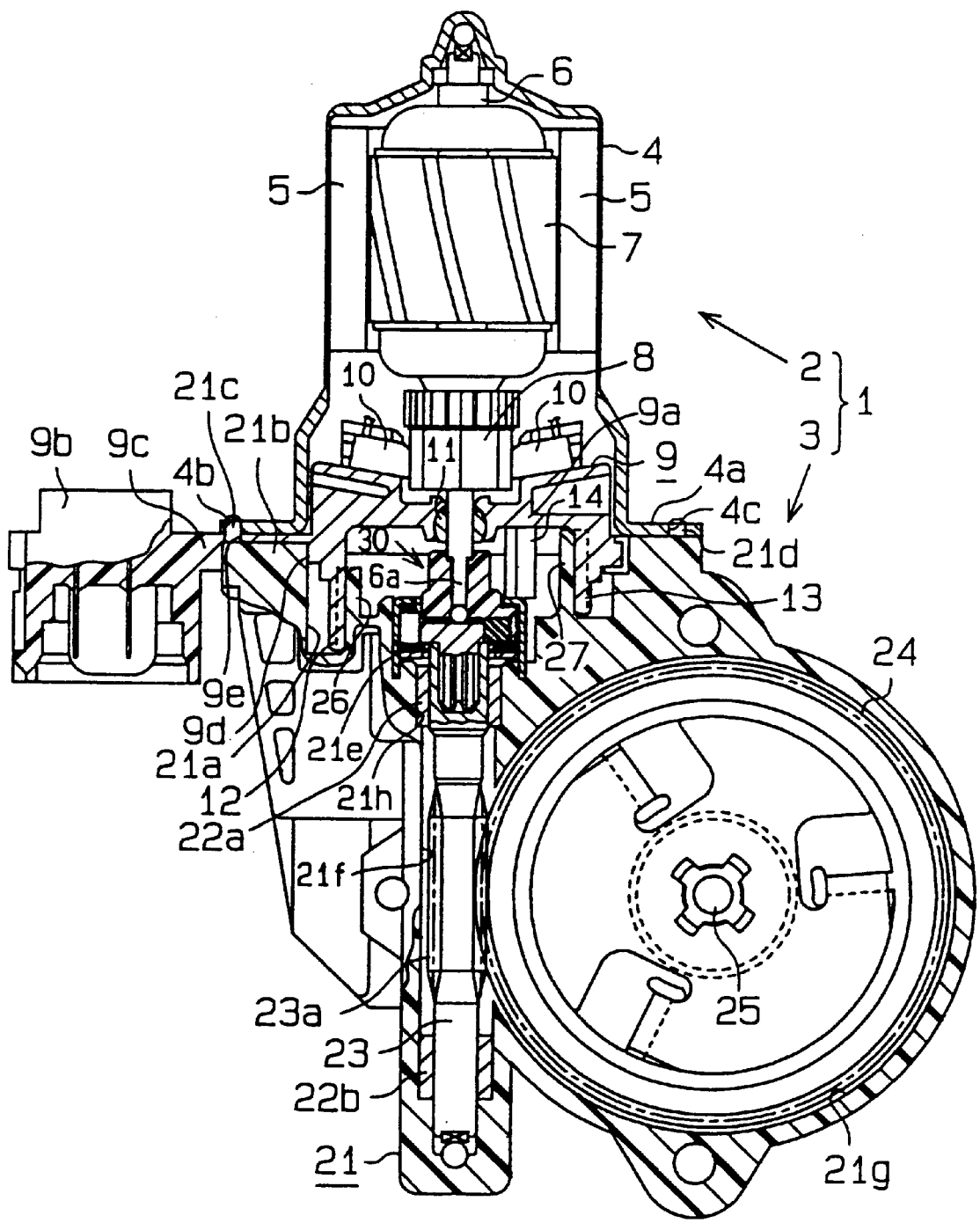
FIG. 1 is a cross-sectional view illustrating a motor according to the present invention.
Figure 2:
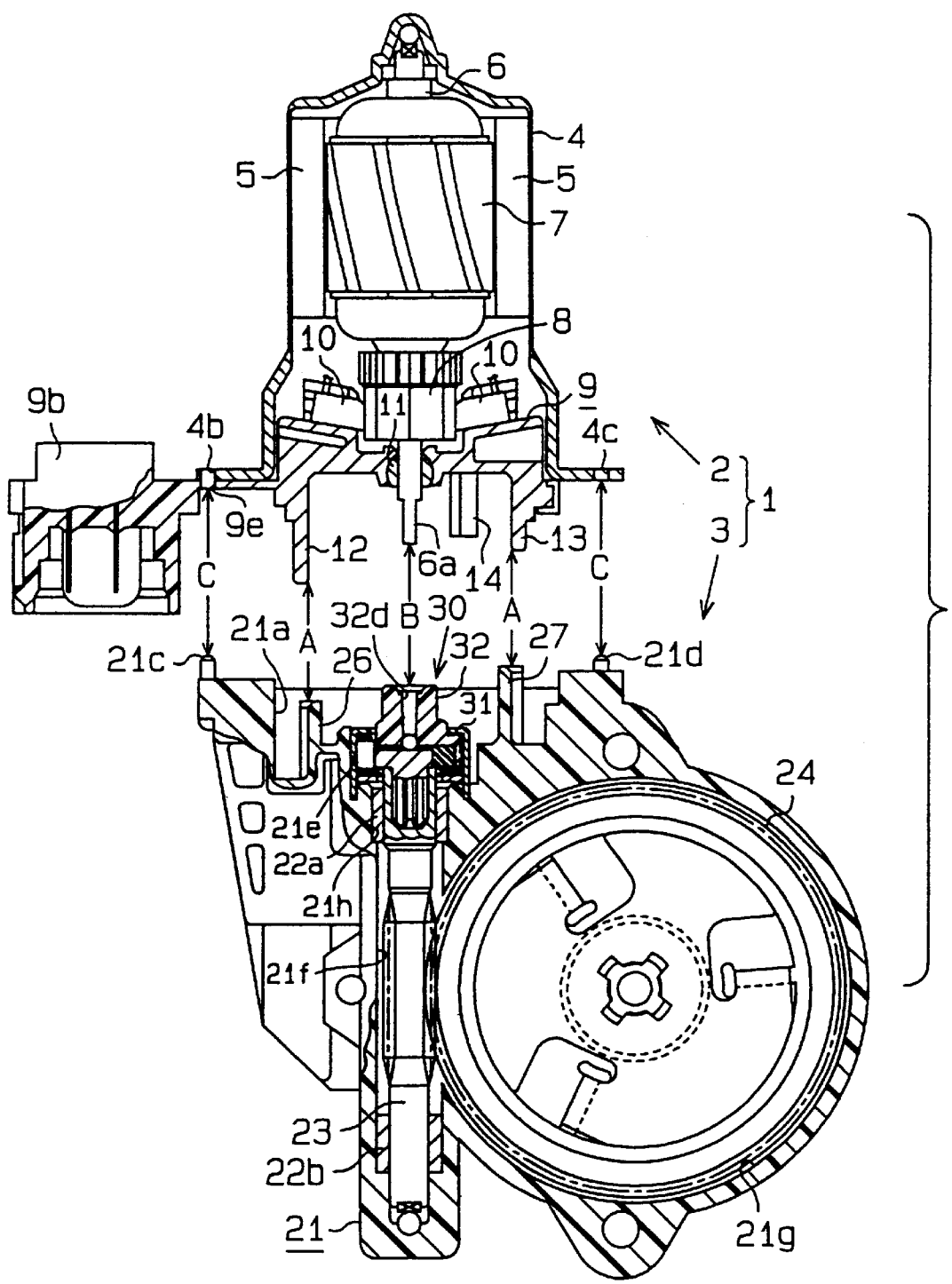
FIG. 2 is an exploded cross-sectional view illustrating the motor according to the present invention.

Referring now to FIGS. 1 through 10, a first embodiment of the present invention is now described. Referring to FIG. 1 and FIG. 2, a motor 1 is illustrated having a motor body 2 and a speed reducer 3. As shown in FIG. 1, the motor body 2 is equipped with a yoke housing 4, a plurality of magnets 5, a spindle 6, an armature 7, a commutator 8, a brush holder 9 made of a resin, and brushes 10.

Figure 6:
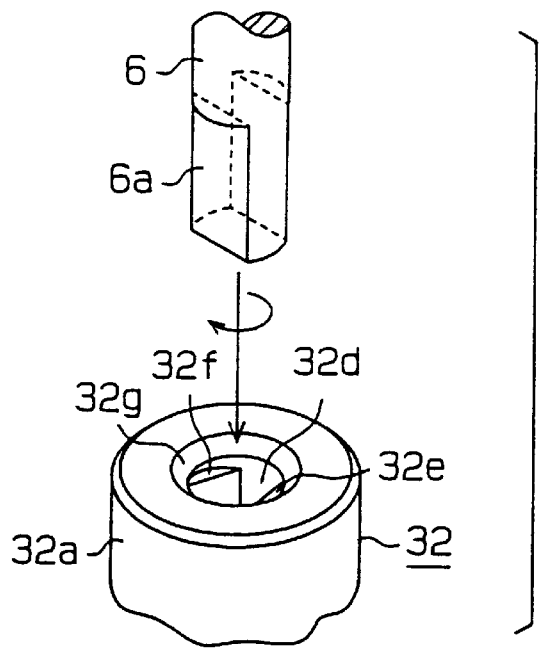
FIG. 6 is an exploded perspective view of a two-plane width bulge and a two-plane width hole for a motor according to the present invention.

The yoke housing 4 is formed into a generally flat bottomed cylindrical shape. On the inner circumference of the yoke housing 4, magnets 5 are fixed opposite each other. Spindle 6 is rotatably supported at a root end portion, up in FIG. 1, on the inside top of yoke housing 4. At a leading end of spindle 6, there is a two-plane bulge 6a which is chamfered parallel to the column shape, thereby acting as a first joint portion and a fitting bulge (as shown in FIG. 6).

The armature 7 is fixed at an intermediate portion of the spindle 6, thereby positioned proximate magnets 5. Commutator 8 is fixed on the spindle 6 on the leading end side of the armature 7.

Figure 3:
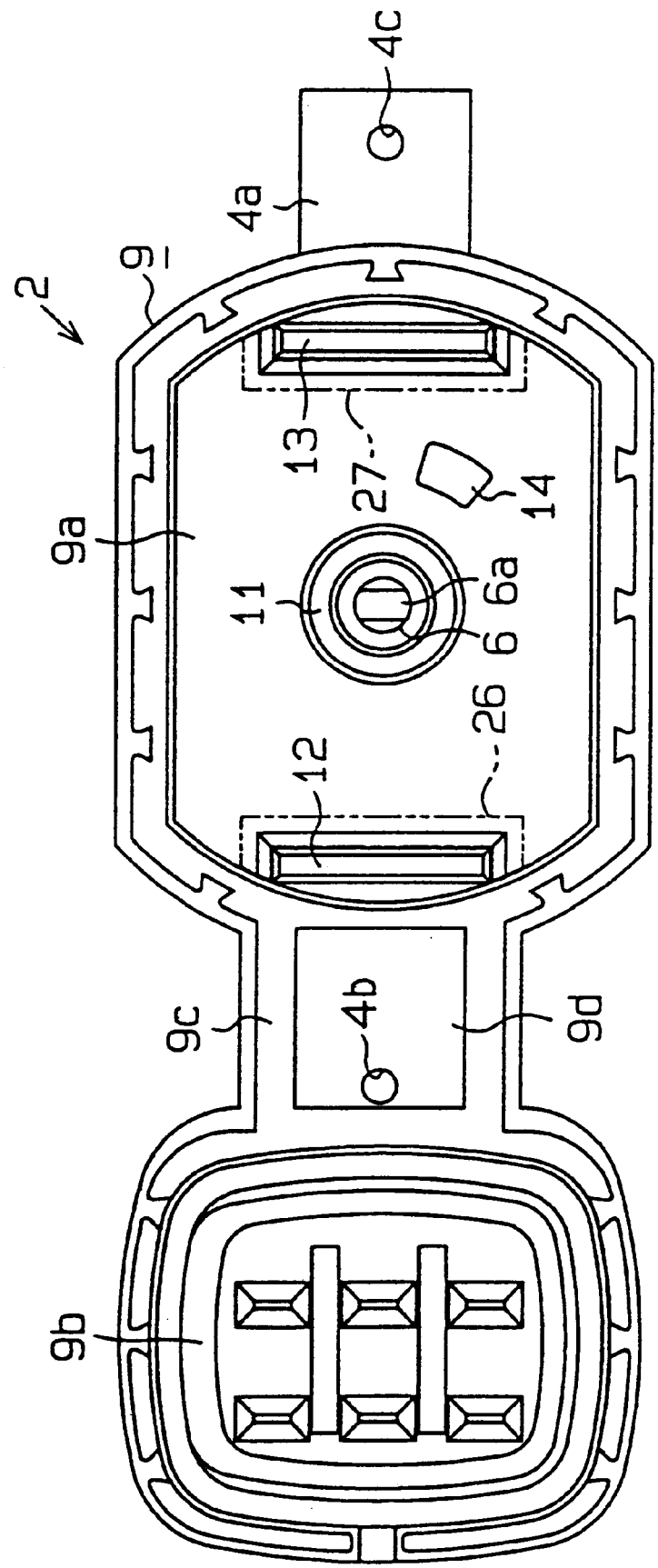
FIG. 3 is a plan view illustrating a motor body for a motor according to the present invention.

In an opening of yoke housing 4, a flange portion 4a extends radially outward therefrom having two through holes 4b and 4c. Also in the opening of the yoke housing 4, a brush holder 9 is fitted and fixed. Brush holder 9 is equipped with a holder body 9a, shaped to match and substantially cover the opening of the yoke housing 4. Also, the opening has a feeder portion (or connector) 9b protruding radially outward from the spindle 6 from the flange portion 4a (as shown in FIG. 3). At the holder body 9a on the inner side of the yoke housing 4, paired brushes 10 are arranged and connected with the feeder portion 9b through wires (not-shown). Generally, at the center of the holder body 9a, bearing 11 is disposed which rotatably supports the leading end of spindle 6.

At a joint portion 9c which joins the holder body 9a and the feeder portion 9b of the brush holder 9, a recess 9d is formed which is recessed from the side (i.e., the lower side of FIGS. 1 and 2) of the speed reducer 3 (as shown in FIG. 3). In the joint portion 9c, a through hole 9e is provided which aligns with a through hole 4b and extends from the bottom portion of the recess 9d.

On holder body 9a, a pair of first engaging bulges 12 and 13 is provided as the first engaging portion for engaging speed reducer 3. Bulges 12 and 13 extend parallel with the spindle 6. The two first engaging bulges 12 and 13 are formed in parallel on opposite sides of spindle 6, as shown in FIG. 3. First engaging bulge 12 extends further (i.e., downward in FIGS. 1 and 2) than first engaging bulge 13. The first engaging bulges 12 and 13 are chamfered at the individual ridges of their leading ends. At the central portion of the holder body 9a on a lower side (i.e., the lower side of FIGS. 1 and 2) of the speed reducer 3, an extended portion 14 is formed which extends in the same direction as first engaging bulges 12 and 13.

The brushes 10 are arranged at positions which correspond to and contact with the commutator 8. Therefore, when an electric current is fed from an external power source to the feeder portion 9b, it is fed to the coil winding on the armature 7 through the brushes 10 and the commutator 8. Therefore, the armature 7 and thus spindle 6 of the motor body 2 is rotationally driven.

The speed reducer 3 is equipped with a gear housing 21, first and second bearings 22a and 22b, a worm shaft 23, a worm wheel 24 and an output shaft 25. The gear housing 21 is made of a resin and is fixed at its upper end portion (the upper side end portion in FIG. 1) with respect to the yoke housing 4 and the brush holder 9.

In the center of the upper end portion of the gear housing 21, there is an open recess 21a. On the upper end portion of gear housing 21, there is also a bulge 21b which is fitted in the recess 9d of the brush holder 9. On bulge 21b, there is a fitting bulge 21c to be fitted in the through hole 9e of the brush holder 9 and one through hole 4b of the yoke housing 4. On the upper end portion of the gear housing 21, there is a fitting bulge 21d which is fitted in the other through hole 4c of the yoke housing 4.

Figure 7:
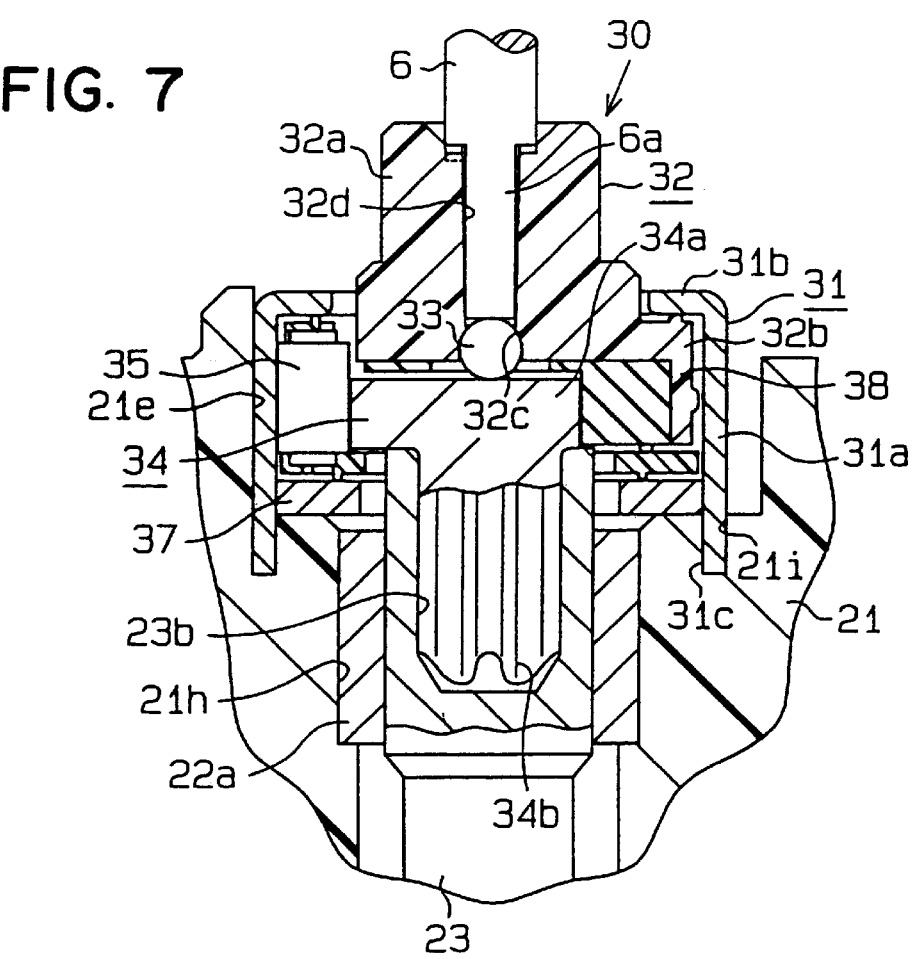
FIG. 7 is a partial cross-sectional view of a clutch portion of a motor according to the present invention.

In the gear housing 21, there is a clutch receiving recess 21e (as shown in FIG. 7) which is recessed from the center of the bottom portion of the open recess 21a. Also, a worm shaft receiving recess 21f is provided which extends in the axial direction of spindle 6 from the center of the bottom portion of the clutch receiving recess 21e. In the gear housing 21, a wheel receiving portion 21g is provided perpendicular to the axis at the intermediate portion of the worm shaft receiving recess 21f. The wheel receiving portion 21g communicates with the worm shaft receiving recess 21f. In the opening of the worm shaft receiving recess 21f, there is formed a bearing receiving recess 21h (as shown in FIG. 7).

At the bottom portion of the open recess 21a, there are disposed a pair of second engaging bulges 26 and 27 as the second engaging portion. The two second engaging bulges 26 and 27 extend in parallel along the axial direction of spindle 6. These two second engaging bulges 26 and 27 are formed, as shown in FIG. 3, into generally C-shapes to enclose the first engaging bulges 12 and 13, respectively. Second engaging bulge 26 protrudes lower (upward in FIGS. 1 and 2) than Second engaging bulge 27.

The first bearing 22a is formed into a generally cylindrical shape and fitted in the bearing receiving recess 21h. The second bearing 22b is fitted on the bottom side (lower area in FIG. 1) of the worm shaft receiving recess 21f.

The worm shaft 23 has a worm 23a formed at its intermediate portion and is rotatably supported at its end portions in the worm shaft receiving recess 21f by the first and second bearings 22a and 22b. In the end portion of the worm shaft 23 on the side, as shown in FIG. 7, a fitting hole 23b is provided having a number of tooth grooves in its inner circumference.

The worm wheel 24 positioned in the wheel receiving portion 21g to mesh with the worm 23a and rotatable on its axis. This axis is normal to the sheet of FIG. 1 and perpendicular to the worm shaft 23. Moreover, output shaft 25 is connected to worm wheel 24 such that it rotates on a common axis with worm wheel 24.

The spindle 6 is coupled to the worm shaft 23 through a clutch 30. This clutch 30 is equipped, as shown in FIGS. 4 to 8, with a clutch housing 31, a drive side rotor 32, a ball 33, a driven side rotor 34, a plurality of (or three) roller members 35, a support member 36 and a cover plate 37. The clutch housing 31 is equipped with a cylindrical outer ring 31a and an annular cover portion 31b extending radially inward from one end (the lower end in FIG. 4) of the outer ring 31a. In an other end(upper end in FIG. 4) of the outer ring 31a, there is a serration portion 31c which has a plurality of generally triangular tooth grooves in its inner circumference. The drive side rotor 32, the ball 33, the driven side rotor 34, the roller members 35, the support member 36 and the cover plate 37 are assembled and received in the clutch housing 31 to provide one unit which is the clutch 30.

The serration portion 31c of the clutch housing 31 is fitted and fixed in an annular serrated hole 21i formed at the center of the bottom portion of the clutch receiving recess 21e, as shown in FIG. 7. The cover portion 31b of the clutch housing 31 is held by the extended portion 14 of the brush holder 9, as shown in FIG. 1, to prevent the housing 31 from coming out.

The drive side rotor 32 is made of a resin and has a journal portion 32a. A disc portion 32b is provided which radially extends outward from the journal portion 32a. The drive side rotor 32 is slidable and rotatable against the cover portion 31b of the clutch housing 31 at the root end side of the disc portion 32b. At the center portion of the drive side rotor 32, there is an axial 32c which extends through the drive side rotor 32. Inside axial hole 32c, there is formed a two-plane width hole 32d having two parallel side walls. The width bulge 6a, having a pair of flats, engages this portion to act as a second joint portion and a fitting bulge.

On a face of the two-plane width hole 32d, as shown in FIGS. 5A to 5C and FIG. 6, there are formed inclined faces 32e and 32f which are directed deep into hole 32d as they go farther in a predetermined circumferential direction (i.e., in the clockwise direction).

In the opening of the two-plane width hole 32d, on the other hand, there is formed a taper face 32g which is directed into the two-plane width hole 32d as it goes inward.

This two-plane width hole 32d communicates with the outside of the clutch housing 31, as shown in FIG. 7, and is non-rotatably jointed to the spindle 6 when the two-plane width bulge 6a of the spindle 6 is engaged. The two-plane width bulge 6a engages spindle 6 only at a predetermined rotational position aligning respective flats of two-plane width bulge 6a with two-plane width hole 32d. As spindle 6 of motor body 2 rotates, therefore, rotating force is transmitted to the drive side rotor 32. As is apparent in FIG. 7, the two plane width hole 32d has a slight taper, thereby allowing guidance and locking of width bulge 6a therein.

Here, as shown in FIG. 2, clutch 30 is fixed in gear housing 21 without the motor body 2 and the speed reducer 3 being assembled. As such, the distance A between the first engaging bulges 12 and 13 and the second engaging bulges 26 and 27 is set shorter than the distance B between the two-plane width bulges 6a and the two-plane width holes 32d. However, the distance B between the two-plane width bulges 6a and the two-plane width hole 32d is set shorter than the distance C between the fitting bulge 21c (or 21d) and the through hole 9e (or the through hole 4c).

Figure 4:
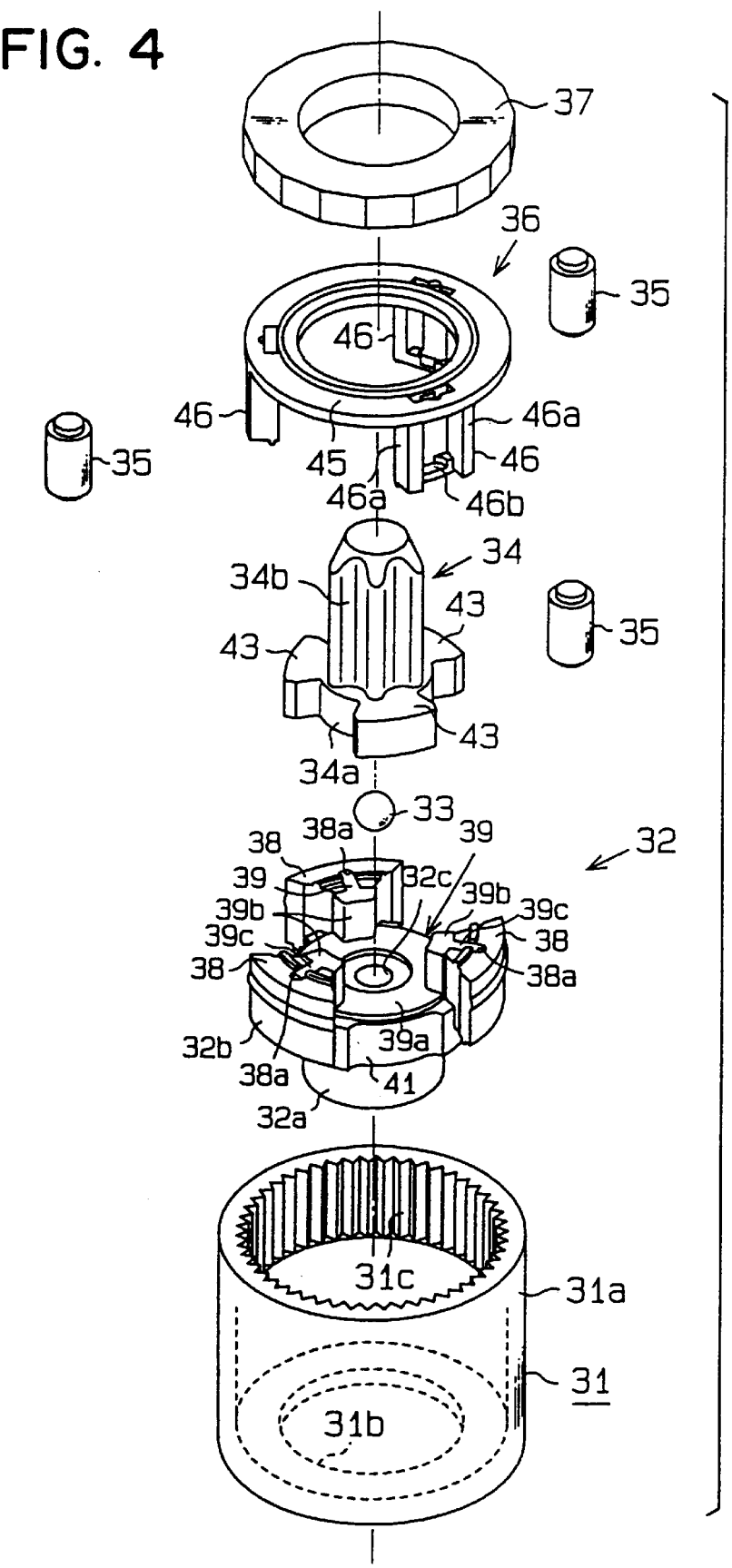
FIG. 4 is an exploded perspective view illustrating a clutch for a motor according to the present invention.

On the leading end side of disc portion 32b of drive side rotor 32, as shown in FIG. 4, there are a plurality of (or three) equal angular sector-shaped protrusions 38 which are protruded axially parallel with spindle 6 along the outer circumference of disc portion 32b. Protrusions 38, as shown in FIG. 8, have fitting grooves 38a which extend radially from the radial inner side to the intermediate portions of protrusions 38.

In the fitting grooves 38a, buffer members 39 are fitted and fixed which are made of rubber. As shown in FIG. 4, buffer members 39 are equipped with a thin ring portion 39a and a plurality of (or three) equal angled buffer portions 39b positioned axially parallel to spindle 6 on the outer circumference side of the ring portion 39a. On the outer circumference side of buffer portions 39b, fitting bulges 39c are positioned corresponding to fitting grooves 38a. Moreover, buffer members 39 are fixed such that the individual fitting bulges 39c are fitted in the individual fitting grooves 38a and such that the ring portion 39a is arranged over the disc portion 32b.

Figure 8:
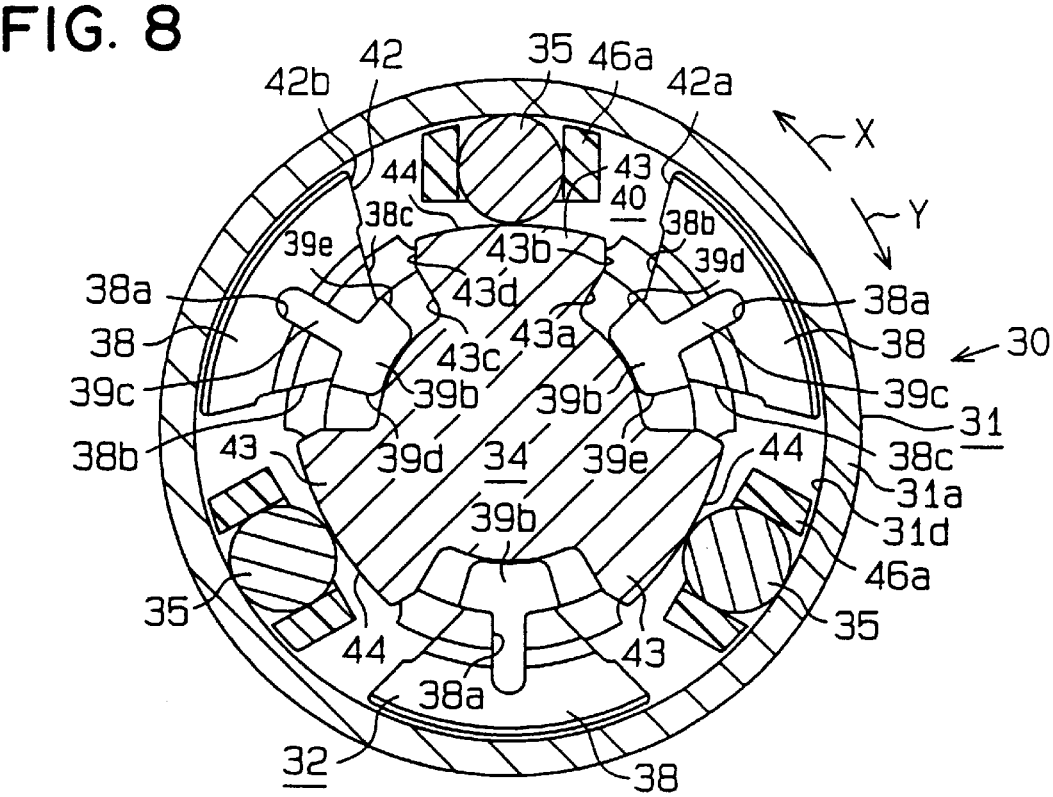
FIG. 8 is a cross-sectional view of clutch for a motor according to the present invention.

The buffer portions 39b are set to have a slightly larger circumferential width than the inner circumference of protrusions 38, as shown in FIG. 8. And, a plurality of (or three) equal angled engaging grooves 40 are positioned by the side faces (or the circumferential faces) 38b and 38c of the adjoining protrusions 38 and the side faces (or the circumferential faces) 39d and 39e of the adjoining buffer portions 39b. These engaging grooves 40 communicate with one another on their center sides. In the outer circumference sides, as not having the protrusions 38, of the disc portion 32b, there are formed grooves 41 which are notched in parallel with the axial direction of spindle 6. The outer circumference sides of the side faces 38b and 38c of the protrusions 38 are slightly bulged in the circumferential direction to form openings 42 of the engaging grooves 40.

The ball 33 is made of a metal and formed into a sphere having an external diameter corresponding to the internal diameter of the axial hole 32c. The ball 33 is received in the axial hole 32c from the leading end side (i.e., on the right-hand side of FIG. 7). Here, the ball 33 is partially protrudes from the axial hole 32c when it is received in the axial hole 32c.

The driven side rotor 34 has a disc portion 34a and a fitting portion 34b protruding from the center portion to the leading end side (the lower side of FIG. 7) of the disc portion 34a. The fitting portion 34b is equipped with a number of teeth corresponding to the fitting hole 23b of the worm shaft 23, as shown in FIG. 7, and is fitted and fixed in the fitting hole 23b.

The disc portion 34a abuts end portion (upward in FIG. 7) against the ball 33 and is enclosed by the protrusions 38 (or the buffer portions 39b), thereby being rotationally positioned. The disc portion 34a is in point contact with the ball 33 so that it rotates smoothly.

On disc portion 34a, as shown in FIGS. 4 and 8, plurality of (or three) generally equal angled sector-shaped engaging bulges 43 are positioned which extend radially outward. These engaging bulges 43 are set to have a smaller circumferential width than that of the engaging grooves 40 and are received in the engaging grooves 40.

On the radially inner sides of the clockwise faces of the engaging bulges 43, as shown in FIG. 8, first buffer faces 43a are positioned which correspond to the one-side faces (or the counter-clockwise faces) 39d of the buffer portions 39b. On the radially outer sides of the clockwise faces of engaging bulges 43, first abutting faces 43b are positioned which correspond to faces 38b (counter clockwise faces) of the protrusions 38. The first buffer faces 43a abuts faces 39d when the drive side rotor 32 rotates counter-clockwise or direction of arrow X until reaching a predetermined position with respect to the driven side rotor 34. When the drive side rotor 32 further rotates counter-clockwise (in direction X) from the predetermined position, the first abutting faces 43b abuts faces 38b of protrusions 38. Here, the drive side rotor 32 further rotates in direction X from the predetermined position, see FIG. 9, as the buffer portions 39b warps or crushes in the circumferential direction.

On the inner circumference sides of the counter-clockwise faces of the engaging bulges 43, second buffer faces 43c are positioned which correspond to the other side faces (or the clockwise faces) of the buffer portions 39b. On the outer circumference sides of the counter-clockwise faces of engaging bulges 43, second abutting faces 43d are positioned which correspond to the clockwise faces of protrusions 38. The second buffer faces 43c abut side faces 39e when the drive side rotor 32 rotates clockwise (or in the direction of arrow Y) to a predetermined position with respect to the driven side rotor 34. Second abutting faces 43d abuts side faces 38c when the drive side rotor 32 further rotates clockwise in direction Y from the predetermined position. Here, the drive side rotor 32 further rotates in direction Y from the predetermined position as the buffer portions 39b warp (or crush) in the circumferential direction.

Control faces 44 are positioned on the outer circumferences of the engaging bulges 43. The control faces 44 of this embodiment are formed to bulge into larger diameter arcs than the rotational locus of their circumferential center portions 44a (i.e., the locus on the axis of the driven side rotor 34), as seen in the axial direction. As a result, the control faces 44 are arranged to have their center portions 44a radially outside of the straight lines joining their two circumferential side portions 44b and 44c. On the other hand, the control faces 44 are so formed that the intermediate portions 44*d* between the center portions 44*a* and the side portions 44*b* and 44*c* are radially outside of the straight lines joining the center portions 44*a* and the side portions 44*b* and 44*c*.

The roller members 35 are formed of a metallic material and have a column shape. Roller members 35 are arranged between first and second faces 42*a* and 42*b* of the openings 42 and between the control faces 44 and the inner circumference 31*d* of the outer ring 31*a*.

The diameter of the roller members 35 is set smaller than the length of the gap between the center portions 44*a* and the inner circumference 31*d*. The diameter is also larger than the gap between the side portions 44*b* and 44*c* of the control faces 44 and the inner circumference 31*d* of the outer ring 31*a*. Moreover, the diameter of the roller members 35 is set equal to the gap between the intermediate portions 44*d* between the central portions 44*a* and the side portions 44*b* and 44*c* and the inner circumference 31*d* of the outer ring 31*a*.

The support member 36 is made of a resin and is equipped with a ring plate 45 and three roller supports 46 which axially extend from the ring plate 45 so as to hold the individual roller members 35 rotatably and generally in parallel, as shown in FIG. 4. The roller supports 46 are arranged equal angularly on the ring plate 45.

Each roller support 46 is equipped with a pair of holding plates 46*a* extending axially from the ring plate 45, and a joint member 46*b* joining the leading ends of the two holding plates 46*a*. The gap between the two holding plates 46*a* is set slightly larger than the diameter of the roller members 35, and the gap between the ring plate 45 and the joint members 46*b* is set slightly larger than the axial length of the roller members 35. Moreover, the roller members 35 are rotatably held between the two holding plates 46*a*, the ring plate 45, and the joint members 46*b*. Roller members 35 are positioned immovably in the circumferential direction of ring plate 45, and movably in the radial direction of ring plate 45.

Figure 9:
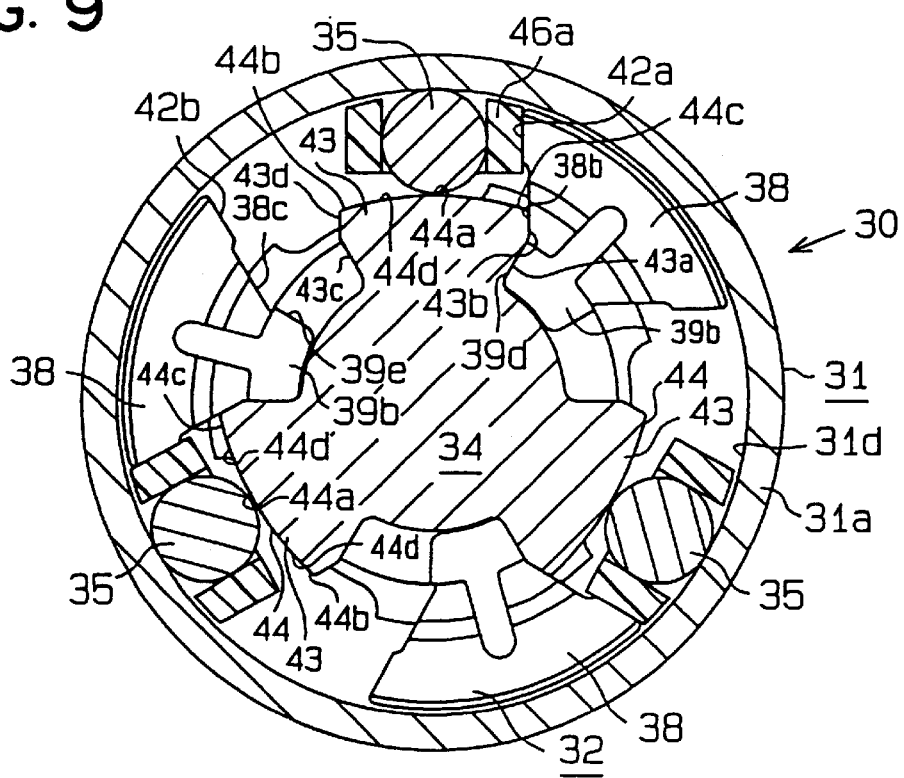
FIG. 9 is a cross-sectional view of clutch for a motor according to the present invention.

The shapes of individual members 35, 38, 43 and 46 are set, as shown in FIG. 9, such that the roller members 35 contact center portions 44*a* of the control faces 44 when faces 38*b* abut faces 43*b* of the engaging bulges 43 and when faces 42*a* abut roller supports 46. Likewise, individual members 35, 38, 43 and 46 are shaped such that the roller members 35 contact center portions 44*a* when other-side faces 38*c* abut faces 43*d* and when second faces 42*b* of openings 42 abut roller supports 46.

The cover plate 37 is an annular plate made of a resin and fits in outer ring 31*a* of the clutch housing 31 to be in sliding contact with the ring plate 45.

The operation of the present invention, including the motor 1 and clutch 30 is now described. When the motor body 2 is activated to rotate spindle 6 counter-clockwise in direction X, as in FIG. 8, the drive side rotor 32 rotates together with the spindle 6 in the same direction. When faces 38*b* of the protrusions 38 abut faces 43*b* of engaging bulges 43, the roller members 35 are arranged at positions (hereinafter "neutral positions") corresponding to the center portions 44*a* of the control faces 44.

Here, before faces 38*b* abut faces 43*b*, the one-side faces 39*d* of the buffer portions 39*b* abut against the first buffer faces 43*a* of the engaging bulges 43 so that the impact at the abutting time is reduced.

In this neutral state, the roller members 35 are not clamped between the control faces 44 of the engaging bulges 43 and the inner circumference 31*d* of the outer ring 31*a*. As such, the driven side rotor 34, having the engaging bulges 43, does not rotate with respect to clutch housing 31. As the drive side rotor 32 further rotates counter-clockwise, therefore, its rotating force is transmitted from the protrusions 38 to the driven side rotor 34 to rotate the driven side rotor 34. At this time, the rotating force in the same direction (or in the arrow direction X) is transmitted from first faces 42*a* to the roller members 35. As such, the roller members 35 are moved in the same direction.

When spindle 6 is rotated clockwise (or in the arrow direction Y) of FIG. 8, alternatively, the roller members 35 again positioned at the neutral positions by protrusions 38. Here, roller members 35 are not clamped between the control faces 44 and the inner circumference 31*d*. As such, the driven side rotor 34, having the engaging bulges 43, does not rotate with respect to the clutch housing 31. Therefore, the rotating force of the drive side rotor 32 is transmitted from protrusions 38 to the driven side rotor 34 to rotate the driven side rotor 34.

Figure 10:
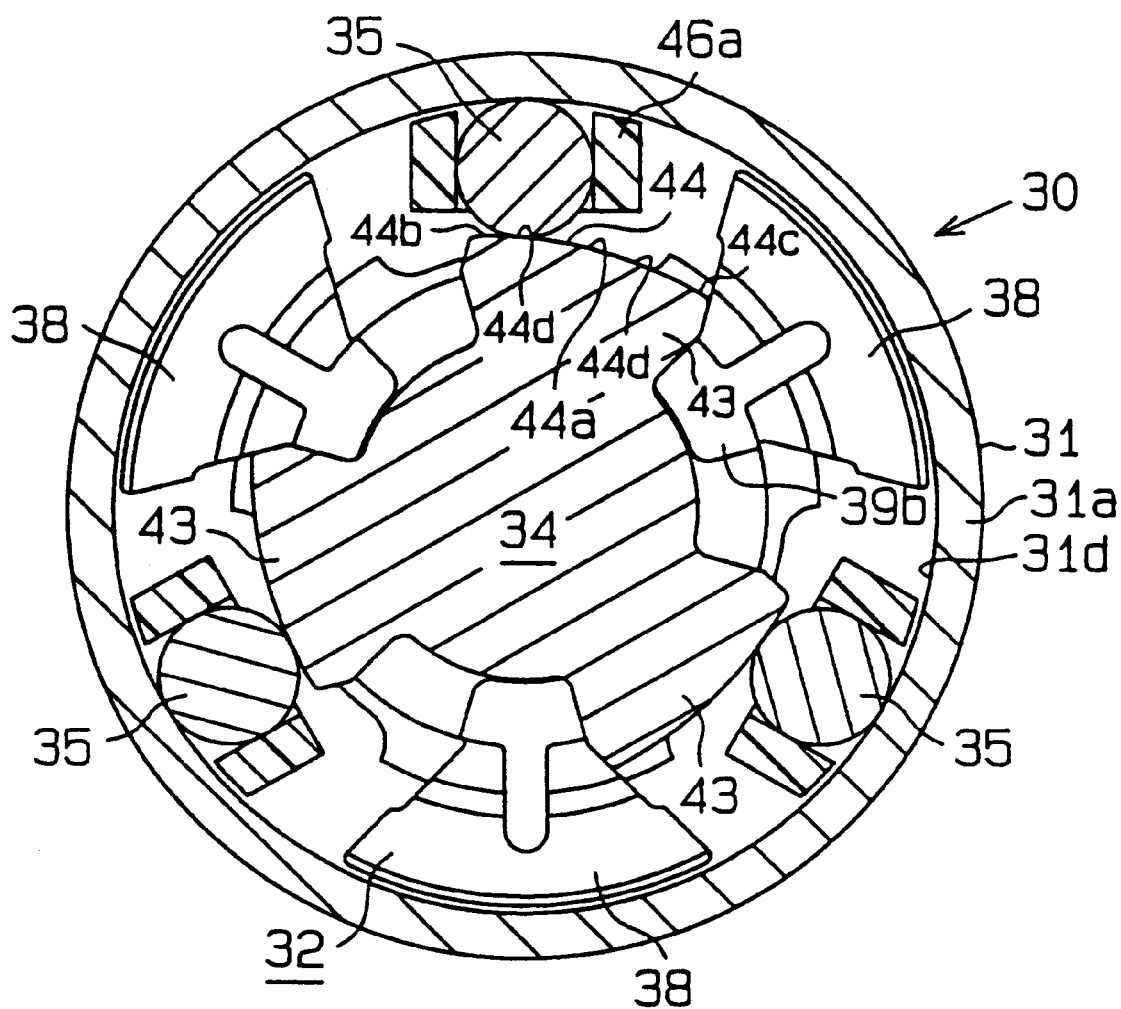
FIG. 10 is a cross-sectional view of clutch for a motor according to the present invention.

Next, worm shaft 23 rotates together with the driven side rotor 34 so that worm wheel 24 and output shaft 25 rotate accordingly. Therefore, when a load is applied to the side of the output shaft 25, with the motor 1 being stopped, the driven side rotor is rotated. When the drive side rotor 34 is rotated in direction Y, as shown in FIG. 8, the roller members 35 move toward side portions 44*b* (or the intermediate portions 44*d*) of the control faces 44. When the roller members 35 move to the intermediate portions 44*d*, as shown in FIG. 10, they are clamped (or locked) by the control faces 44 and the inner circumference 31*d* of the outer ring 31*d*. Since this outer ring 31*a* is fixed, moreover, any further rotation of the drive side rotor 34 is blocked not to rotate the drive side rotor 32.

When the drive side rotor 34 is rotated in direction X of FIG. 8, the roller members 35 move toward the side portions 44*b* (or the intermediate portions 44*d*) because the drive side rotor 32 is stopped. When the roller members 35 move to the intermediate portions 44*d*, they are clamped (or locked) by the control faces 44 and the inner circumference 31*d* of the outer ring 31*a*. Since outer ring 31*a* is fixed, moreover, any further rotation of the drive side rotor 34 is blocked so that the drive side rotor 32 does not rotate.

Even if a high load is thus applied to the output shaft 25, the rotation of the drive side rotor 34 is blocked.

The assembly of the motor 1 is now described. First, the components of the motor body 2 including armature 7 and brush holder 9 are assembled with the yoke housing 4, as shown in FIG. 2. The speed reducer 3 components including worm shaft 23 and worm wheel 24 are assembled with the gear housing 21. The clutch 30 is assembled with the speed reducer 3. Next, the fitting bulges 21*c* and 21*d* of the gear housing 21 are fitted in the through holes 4*b* and 4*c* of the yoke housing 4. Also, the yoke housing 4 and the gear housing 21 are fastened by means of screws (not-shown).

Figure 5C:
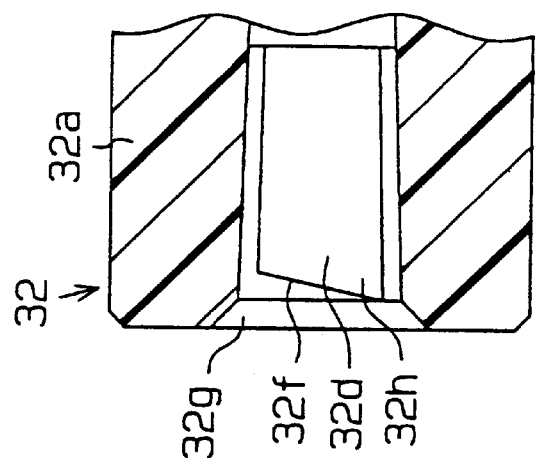
FIG. 5C is a cross-sectional view taken along line VC—VC of FIG. 5A of a drive side rotor for a motor according to the present invention.
Figure 5A:
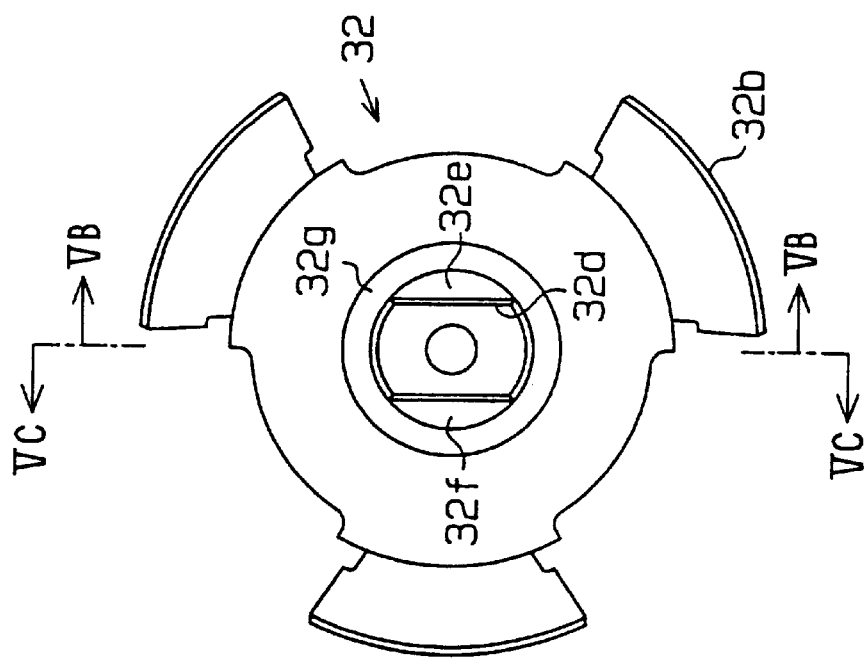
FIG. 5A is a plan view of a drive side rotor for a motor according to the present invention.
Figure 5B:
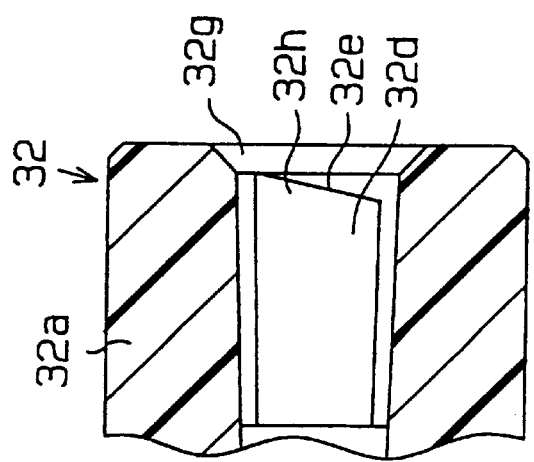
FIG. 5B is a cross-sectional view taken along line VB—VB of FIG. 5A of a drive side rotor for a motor according to the present invention.

When housings 4 and 21 are assembled, first engaging bulges 12 and 13 and the second engaging bulges 26 and 27 are engaged to position and hold spindle 6 and worm shaft 23 on their common axis. If the relative rotational positions of the two-plane width bulge 6*a* and the two-plane width hole 32*d* fail to be at their predetermined positions, as shown in FIG. 6, electric current is fed from an external power source to feeder portion 9*b* while urging yoke housing 4 and gear housing 21 together. This drives the spindle 6 rotationally in the required predetermined direction (clockwise, as shown in FIG. 6). Then, the two-plane width bulge 6*a* is directed and joined in the two-plane width hole 32*d* by the inclined faces 32e and 32f. Also, the two-plane width bulge 6a is guided to below the inclined faces 32e and 32f (toward the bottom of FIG. 6) so that the rotational position relative to the two-plane width hole 32d takes the required predetermined position. The two-plane width bulge 6a is circumferentially engaged with wall face 32h (as shown in FIGS. 5B and 5C), as formed by forming the inclined faces 32e and 32f. This acts as the regulating portion corresponding to the upper portions of the inclined faces 32e and 32f so that it is reliably fitted in the two-plane width hole 32d while retaining the predetermined position.

Now will be described the effects featuring the embodiment thus far described. (1) With respect to FIG. 2, as described hereinbefore, the distance A between the first engaging bulges 12 and 13 and the second engaging bulges 26 and 27 is set shorter than the distance B between the two-plane width bulge 6a and the two-plane width hole 32d. When housings 4 and 21 are assembled, first engaging bulges 12 and 13 and second engaging bulges 26 and 27 are engaged to position the spindle 6 and the worm shaft 23 on a common axis. Thus, the spindle 6 and worm shaft 23 are positioned on their common axis before the two-plane width bulge 6a and the two-plane width hole 32d are jointed, facilitating assembly. This makes it possible to shorten assembly time.

(2) When the spindle 6 and worm shaft 23 are positioned on their common axis but the relative rotational positions of the two-plane width bulge 6a and the two-plane width hole 32d fail to be located at the correct predetermined positions, the two-plane width bulge 6a is fitted in the two-plane width hole 32d by driving the spindle 6 (or the two-plane width bulge 6a) rotationally in the predetermined direction (i.e., clockwise, as seen from the spindle 6) while the yoke housing 4 and the gear housing 21 are urged in the assembled direction (toward each other). As a result, it is easy to fit and assemble the two-plane width bulge 6a in the two-plane width hole 32d. (3) On the face of the opening of the two-plane width hole 32d which overlaps two-plane width bulge 6a in the axial direction, when the spindle 6 and drive side rotor 32 are on a common axis, inclined faces 32e and 32f are positioned thereby facilitating assembly. When the spindle 6 (or the two-plane width bulge 6a) is rotationally driven in the predetermined direction, therefore, the two-plane width bulge 6a aligns, slides in and is joined into two-plane width hole 32d by the inclined faces 32e and 32f. The two-plane width bulge 6a is guided by the inclined faces 32e and 32f so that its rotational position relative to the two-plane width hole 32d takes the predetermined position. Once inside, the two-plane width bulge is held at the predetermined position so that it is reliably fitted in the two-plane width hole 32d, because it circumferentially engages, even if rotated in the predetermined direction, with the circumferential wall face 32h (as shown in FIG. 5B and 5C) corresponding to the upper portions of the inclined faces 32e and 32f.

(4) In the opening of the two-plane width hole 32d, on the other hand, there is a taper face 32g which is directed deeper into the two-plane width hole 32d as it goes the farther inward. Even if the spindle 6 (or the two-plane width bulge 6a) and -the worm shaft 23 (or the two-plane width hole 32d) are slightly misaligned from the common axis, the two-plane width bulge 6a is guided to the common axis shared with the two-plane width hole 32d by the taper face 32g, when the yoke housing 4 and the gear housing 21 are urged in the assembled direction. This makes it unnecessary for the first engaging bulges 12 and 13 and the second engaging bulges 26 and 27 to be high precision.

(5) The first engaging bulge 12 protrudes higher (i.e., downward of FIGS. 1 and 2) than the other first engaging bulge 13. The second engaging bulge 26 (upward of FIGS. 1 and 2) extends lower than the other second engaging bulge 27. The degree of freedom for the assembly is enlarged such that the second engaging bulges 26 and 27 are engaged while being inclined with the first engaging bulges 12 and 13. As a result, the assembling work is facilitated.

(6) The first engaging bulges 12 and 13 are formed on the brush holder 9 so that the number of parts is not increased by the first engaging bulges 12 and 13. On the other hand, the first engaging bulges 12 and 13 are made of resin so that their cost is not increased.

The embodiment thus far described may be practiced by the following modifications. In the present invention, the first engaging bulges 12 and 13 are provided as the first engaging portion on the side of the yoke housing 4, and the paired second engaging bulges 26 and 27 are provided as the second engaging portion on the side of the gear housing 21. However, the number and shape of the engaging bulges may be modified in any manner so long as they can engage, before the two-plane width bulge 6a and the two-plane width hole 32d engage, to position the spindle 6 (or the two-plane width bulge 6a) and the worm shaft 23 (or the two-plane width hole 32d) on the common axis when the two housings 4 and 21 are assembled. For example, the first engaging portion and the second engaging portion may have four bulges and four recesses. With this modification, effects similar to those of the present embodiment could be obtained.

In the present invention, the first engaging bulge 12 protrudes higher (downward of FIGS. 1 and 2) than the other first engaging bulge 13. The second engaging bulge 26 protrude lower (upward of FIGS. 1 and 2) than the other second engaging bulge 27. However, the first pair of engaging bulges 12 and 13 and the second pair of engaging bulges 26 and 27 may have the same height.

In the present invention, the spindle 6 is provided with two-plane width bulge 6a as the first connection portion (or the fitting bulge), and the drive side rotor 32 of the clutch 30 is provided with the two-plane width hole 32d as the second connection portion (or the fitting recess). However, the first and second connection portions may be modified in any manner, so long as they can be axially connected with their relative rotational positions being at the predetermined positions. And, they can be modified so long as they engage in the rotating direction when connected, but are non-rotatable relative to each other. For example, the spindle 6 may be provided with a serration portion acting as the first connection portion having a number of generally triangular teeth on its outer circumference, and the drive side rotor 32 may be provided with a serration portion as the second connection portion having a number of generally triangular tooth grooves in its inner circumference. On the other hand, the spindle 6 may be provided with a D-shaped bulge as the first connection having a D-shaped section, and the drive side rotor 32 may be provided with a D-shaped recess as the second connection portion having a D-shaped section. With these modification, effects similar to those of (1), (2), (5) and (6) can be obtained. In these modifications, on the face of the opening of the second connection portion (or the serration portion, the D-shaped recess) which overlaps the rotating first connection portion (or the serration portion, the D-shaped bulge) in the axial direction when the spindle 6 and the drive side rotor 32 are positioned on the common axis, inclined faces are formed which are directed deeper into the recess as they extend farther in a predetermined circumferential direction. With this modification, moreover, an effect similar to that of the embodiment (3) can be obtained.

In the present invention, the clutch 30 is fixed on the speed reducer 3, and the two-plane width hole 32d are formed as the second connection portion (or the fitting recess) in the drive side rotor 32 disposed in the clutch 30 and coupled to the worm shaft 23. In the case of a motor having no clutch 30, a suitable modification may be made such that a two-plane width recess corresponding to the two-plane width bulge 6a of the spindle 6 is formed as the second connection portion directly in the worm shaft 23. When a coupling device such as a planetary gear mechanism is coupled, in place of the clutch 30, to the worm shaft 23, on the other hand, a suitable modification may be made such that the two-plane width hole is formed as the second connection portion at the coupling portion of the coupling device. Of course, the clutch 30 (or the coupling device) may be fixed, in advance, on the motor body 2. In this case, the coupling portion of the coupling device to the worm shaft 23 is used as the first connection portion, and the coupling portion of the worm shaft 23 to the coupling device is used as the second connection portion. With this construction, too, effects similar to those of earlier embodiments could be obtained.

In the embodiment, the two-plane width bulge 6a is fitted in the two-plane width hole 32d by driving the spindle 6 rotationally in the predetermined direction with the relative rotational directions of the two-plane width bulge 6a and the two-plane width hole 32d being at the predetermined positions. This is done while the yoke housing 4 and the gear housing 21 are urged in the assembled direction. With the spindle 6 and the worm shaft 23 being positioned on the common axis, however, the two-plane width bulge 6a may be fitted in the two-plane width hole 32d by setting the relative rotational positions of the bulge 6a and the hole 32d manually to the predetermined positions. With this modification, effects similar to those of (1), (5) and (6) can be obtained.

In the present invention, on the face of the opening of the two-plane width hole 32d which overlaps the rotating locus range of the two-plane width bulge 6a in the axial direction when the spindle 6 (the two-plane width bulge 6a) and the drive side rotor 32 are arranged on a common axis, inclined faces 32e and 32f are formed which are directed deeper into hole 32d as they extend in a predetermined circumferential direction. However, these inclined faces 32e and 32f need not be formed. With this modification, effects similar to those of (1), (2), (5) and (6) could be obtained.

In the present invention, around the inclined faces 32e and 32f and the two-plane width hole 32d, there is a taper face 32g which is directed deeper into the two-plane width hole 32d as it extends toward the inclined faces 32e, 32f and two-plane width hole 32d. However, this taper face 32g need not be formed. With this modification, effects similar to those of (1) to (3), (5) and (6) can be obtained.

In the present invention, first engaging bulges 12 and 13 are formed on the brush holder 9. However, first engaging bulges 12 and 13 may be provided by fixing another member on the brush holder 9, by extending the brushes from the yoke housing 4 or by other means. With this modification, effects similar to those of (1) to (6) can be obtained. Of course, the second engaging bulges 26 and 27 may be modified into another construction so long as they have similar functions.

While the above-described embodiments refer to examples of usage of the present invention, it is understood that the present invention may be applied to other usage, modifications and variations of the same, and is not limited to the disclosure provided herein.

What is claimed is:

1. A motor comprising:

a motor body having a yoke housing, said yoke housing having a spindle supported relative to and rotationally driven by said yoke housing, said yoke housing included a first engaging portion, said spindle having a first connection portion; and a speed reducer including a gear housing, said speed reducer having a worm shaft coaxially connected to said spindle, said gear housing including a second engaging portion, said worm shaft having a second connection portion;

wherein said first connection portion and said second connection portion are connectable to coaxially connect and rotatably fix said spindle to said worm shaft, wherein said first engaging portion and said second engaging portion connects said yoke housing and said gear housing while maintaining said first connection portion and said second connection portion in an unconnected state.

2. A motor according to claim 1, wherein:

said first connection portion has a fitting bulge;

said second connection portion includes a fitting recess, said fitting recess engageable to said fitting bulge; and a regulation portion is provided on an open side of said fitting recess for rotating said fitting bulge to a predetermined position relative to said fitting recess, said spindle and said worm shaft being positioned on a common axis, said regulation portion rotating said fitting bulge and said fitting recess to said predetermined position when said yoke housing and said gear housing are biased toward each other in an assembling direction, said predetermined position allowing said fitting bulge to engage said fitting recess.

3. A motor according to claim 2, wherein said regulation portion includes circumferential walls having inclined faces angled toward a bottom of said fitting recess in a predetermined circumferential direction relative to said fitting recess.

4. A motor according to claim 3, wherein said fitting recess has taper faces oppositely positioned from each other and narrowing toward said bottom of said fitting recess, whereby said taper faces guide said fitting bulge into an engaged relationship with said fitting recess.

5. A motor according to claim 4, wherein:

said first engaging portions include one pair of first engaging bulges protruding in an axial direction of said spindle from said yoke housing, said second engaging portions are a second pair of engaging bulges protruding in an axial direction of said worm shaft from said gear housing, said second engaging bulges engageable to said one pair of engaging bulges, and said one pair of engaging bulges have different axial positions of their leading ends than said second engaging bulges.

6. A motor according to claim 5, further comprising a clutch coupled to said worm shaft, said clutch including said second connection portion, said clutch transmitting rotation from said spindle to said worm shaft when coupled to said spindle and prohibiting the transmission of rotation from said worm shaft to said spindle.

7. A method for coupling a motor spindle and a worm shaft, said spindle supported by a yoke housing and rotationally driven relative to of a motor body, said worm shaft supported by a gear housing of a speed reducer, said spindle and said worm shaft being on a common axis when said yoke housing and said gear housing are assembled, said method comprising the steps of:

connecting first engaging portions on said yoke housing with second engaging portions on said gear housing to align said worm shaft with said spindle; and connecting a first connection portion on said spindle with a second connection portion on said worm shaft while said first engaging portions and said second engaging portions hold said worm shaft and said spindle on a common axis.

8. The method according to claim 7, wherein said first connection portion and said second connection portion are connected by driving said spindle rotationally with said yoke housing and said gear housing while urging said gear housing and said yoke housing toward each other.

9. The method according to claim 8, wherein:

said first connection portion includes a fitting bulge; and said second connection portion includes a fitting recess, said second connection portion having a regulation portion including circumferential walls having inclined faces angled toward a bottom of said fitting recess in a predetermined circumferential direction relative to said fitting recess.

10. A motor comprising:

a motor body having a yoke housing, said yoke housing having a spindle supported relative to and rotationally driven by said yoke housing, said yoke housing included a first engaging portion, said first engaging portion comprising a first pair of engaging bulges protruding in an axial direction of said spindle from said yoke housing, said spindle having a first connection portion; and a speed reducer including a gear housing, said speed reducer having a worm shaft coaxially connected to said spindle, said gear housing including a second engaging portion, said second engaging portion including a second pair of engaging bulges, said second engaging bulges extending in an axial direction of said worm shaft, said worm shaft having a second connection portion, said second connection portion having a tapered aperture for receiving said first connection portion, whereby said tapered aperture is for guiding and affixing said first connection portion;

said first connection portion and said second connection portion connectable to coaxially connect and rotatably fix said spindle to said worm shaft, wherein said first engaging portion and said second engaging portion connects said yoke housing and said gear housing while maintaining said first connection portion and said second connection portion in an unconnected state.

* * * * *

UNITED STATES PATENT AND TRADEMARK OFFICE
CERTIFICATE OF CORRECTION

PATENT NO. : 6,242,824 B1
DATED : June 5, 2001
INVENTOR(S) : Katsuhiko Torii and Hiroaki Yamamoto It is certified that error appears in the above-identified patent and that said Letters Patent is hereby corrected as shown below:

Title page,
Item [30], Foreign Application Priorty Data, correct "Feb. 20, 2000" as
-- Feb 2, 2000 --; and correct "12-025197" as -- 2000-025197 --.

Signed and Sealed this

Twentieth Day of July, 2004

JON W. DUDAS
*Acting Director of the United States Patent and Trademark Office*